(12) United States Patent
Kobayashi et al.

(10) Patent No.: US 8,480,177 B2
(45) Date of Patent: Jul. 9, 2013

(54) ARMREST DEVICE

(75) Inventors: Seiji Kobayashi, Kani (JP); Takeshi Mizutani, Komaki (JP)

(73) Assignees: Tokai Chemical Industries, Ltd., Gifu (JP); Rebirth Co., Ltd., Komaki-shi (JP)

( * ) Notice: Subject to any disclaimer, the term of this patent is extended or adjusted under 35 U.S.C. 154(b) by 134 days.

(21) Appl. No.: 13/255,401

(22) PCT Filed: Nov. 30, 2010

(86) PCT No.: PCT/JP2010/006964
§ 371 (c)(1),
(2), (4) Date: Sep. 8, 2011

(87) PCT Pub. No.: WO2012/073273
PCT Pub. Date: Jun. 7, 2012

(65) Prior Publication Data
US 2012/0133189 A1 May 31, 2012

(51) Int. Cl.
*A47C 7/54* (2006.01)
*B60N 2/46* (2006.01)

(52) U.S. Cl.
USPC ............. 297/411.38; 297/411.25; 297/411.32

(58) Field of Classification Search
USPC ........................... 297/411.32, 411.38, 411.25
See application file for complete search history.

(56) References Cited

U.S. PATENT DOCUMENTS

| | | | | |
|---|---|---|---|---|
| 4,165,901 A | * | 8/1979 | Swenson et al. | 297/411.33 |
| 4,828,323 A | * | 5/1989 | Brodersen et al. | 297/411.36 |
| 5,702,157 A | * | 12/1997 | Hurite | 297/411.38 |
| 6,503,018 B2 | * | 1/2003 | Hou et al. | 403/97 |
| 6,752,462 B1 | * | 6/2004 | Kain et al. | 297/411.38 |
| 6,805,513 B2 | * | 10/2004 | Marquina | 403/107 |
| 8,132,978 B2 | * | 3/2012 | Franklin et al. | 403/96 |
| 2002/0105217 A1 | * | 8/2002 | Khedira et al. | 297/411.32 |
| 2003/0057759 A1 | * | 3/2003 | Kain | 297/411.32 |
| 2007/0158991 A1 | * | 7/2007 | Chen et al. | 297/411.32 |
| 2007/0241603 A1 | * | 10/2007 | Otto | 297/411.38 |
| 2010/0308636 A1 | * | 12/2010 | Cebula et al. | 297/411.38 |

FOREIGN PATENT DOCUMENTS

| | | |
|---|---|---|
| JP | A-2003-520156 | 7/2003 |
| JP | A-2007-283908 | 11/2007 |
| JP | B2-4087635 | 5/2008 |

(Continued)

OTHER PUBLICATIONS

International Search Report dated Feb. 15, 2011 in International Application No. PCT/JP2010/006964 (with translation).

*Primary Examiner* — David Dunn
*Assistant Examiner* — Richard Lowry
(74) *Attorney, Agent, or Firm* — Oliff & Berridge, PLC

(57) ABSTRACT

An arm-rest device is constituted by including the following: an armrest body to be installed to a seat rotatably upward/downward; a ratchet mechanism including stationary-side first ratchet teeth, and movable-side second ratchet teeth rotating integrally with the armrest body; coiled springs for urging those in such a direction that they press one another; releasing cam units for releasing the ratchet mechanism from the meshing; elastic claws and a flanged portion for retaining that release; cut-offs for returning the ratchet mechanism to the meshing. And, the armrest body is made of resin, thereby integrally molding the second ratchet teeth at the time of its molding. It thus becomes an armrest device that is lightweight as a whole, whose assembly can also be done with less man-hour requirements, whose feeling of use is also satisfactory, and which is inexpensive and small in size.

12 Claims, 17 Drawing Sheets

FOREIGN PATENT DOCUMENTS

| JP | B2-4089386 | 5/2008 |
| JP | B2-4094421 | 6/2008 |
| JP | A-2010-125219 | 6/2010 |
| WO | WO 01/53130 A1 | 7/2001 |

* cited by examiner

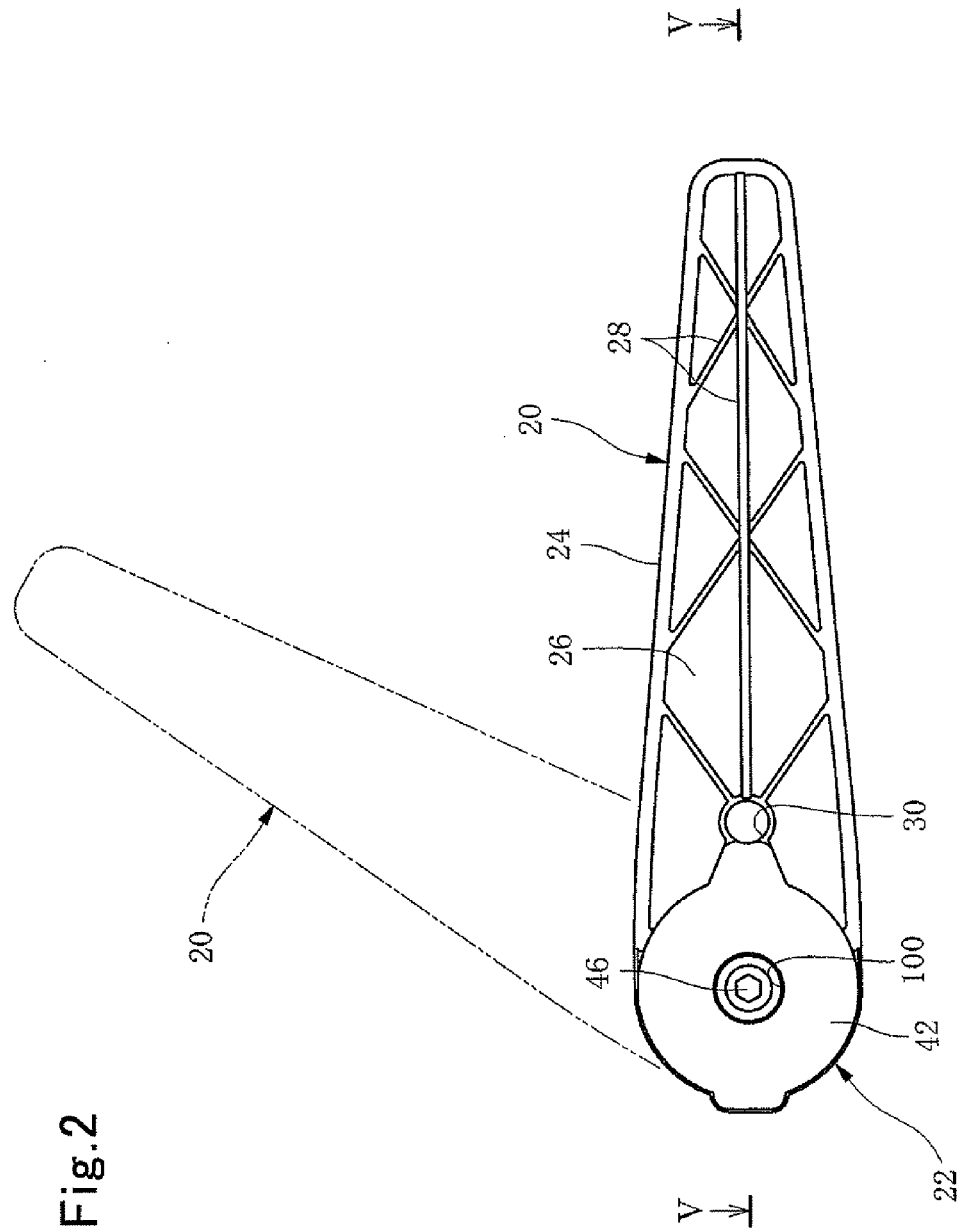

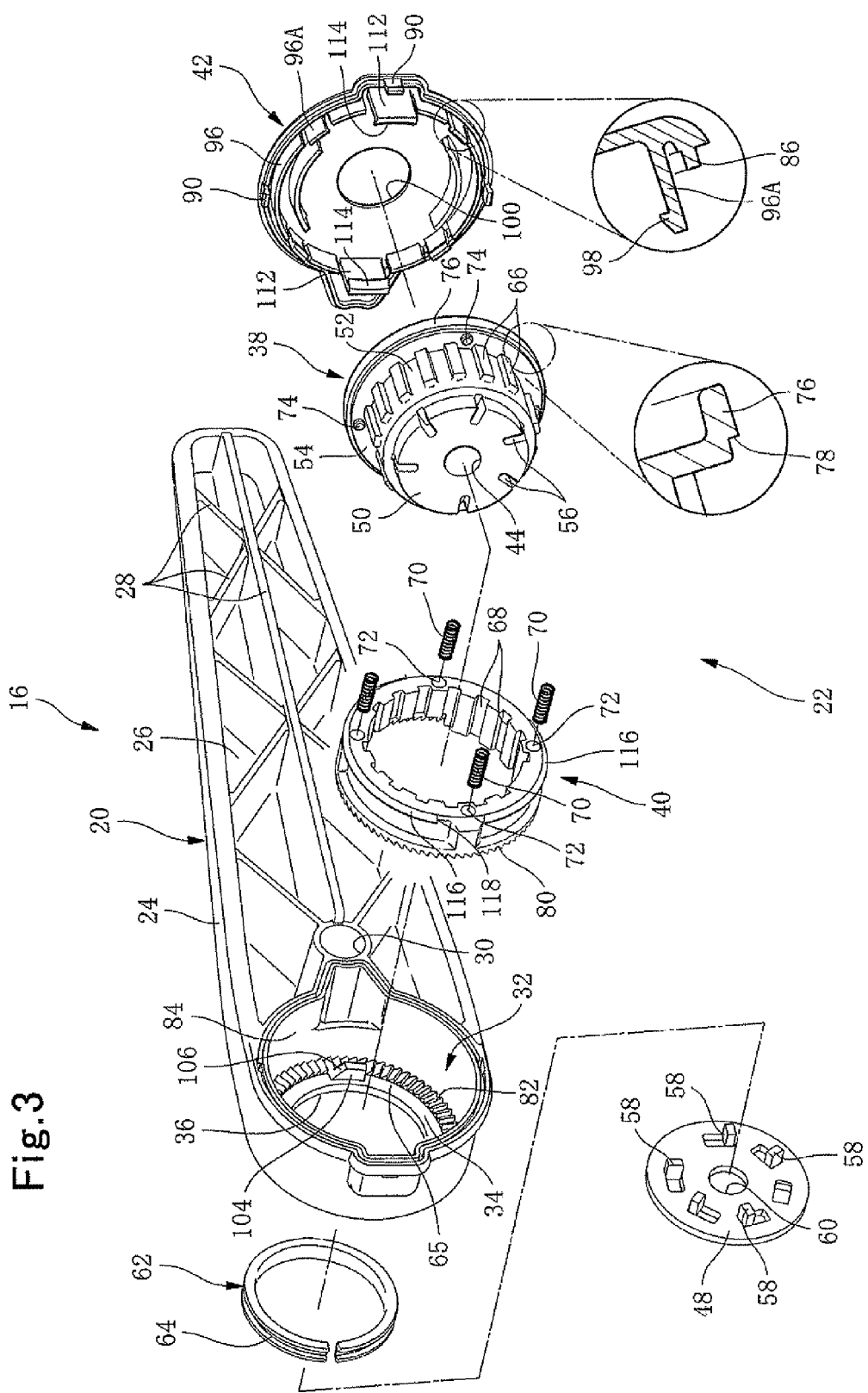

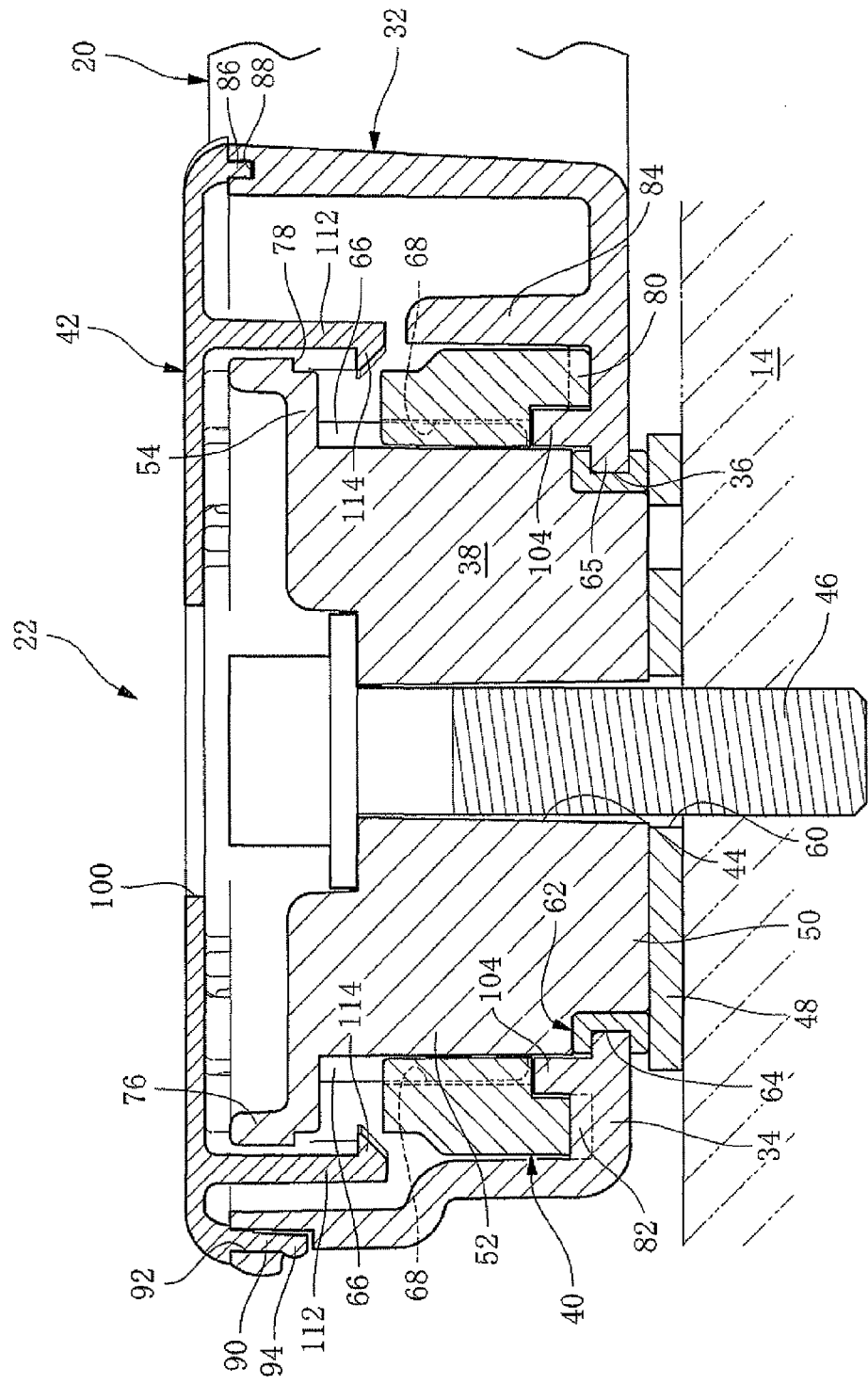

ARMREST DEVICE

TECHNICAL FIELD

This invention relates to an armrest device to be installed to a seat in automobile, and the like; particularly, to an armrest device in which an angular position of the armrest is adjustable in the up/down rotary direction.

BACKGROUND ART

It has been often the case that, in an armrest device to be installed to a seat of automobile, and the like, the armrest (or elbow rest) is made rotatable upward/downward so that it does not interfere with a passenger when he or she sits on the seat or stands up therefrom.

Moreover, it has been carried out to make such an armrest adjustable in the angular position in the up/down rotation so as to make the armrest likely to be used in compliance with users' bodily shape, and so forth.

As a mechanism for that, many have been heretofore employing conventionally a type in which a metallic torsional coiled spring is used as a unidirectional locking spring that allows the upward rotation of armrest body but prohibits the downward rotation.

One being classified with this type is made as follows: a locking spring is inserted into a stationary axial supporter in a seat; one of the ends is fixed to an armrest body so as to make the other end into being a free end; and the locking spring contracts diametrically to tighten the axial supporter up when a user tries to rotate the armrest body downward, thereby prohibiting the downward rotation of the armrest body by the frictional force between the locking spring and the axial supporter; whereas the locking spring expands diametrically and then the locking spring rotates integrally with the armrest body around the axial supporter when he or she rotates the armrest body upward, thereby allowing the upward rotation of the armrest body.

For example, armrest devices using locking springs of this sort are disclosed in Patent Literature No. 1, Patent Literature No. 2 and Patent Literature No. 3 below.

However, in the case of armrest devices being classified with this type, the following problems arise: not only the operation has become heavy upon operating the armrest to rotate because a metallic and large-sized locking spring with heavy weight is used so that the resulting armrest device itself has turned into one with heavy weight; but also it is difficult to meet the request of weight saving especially when being used in the application for a seat of automobile for which weight saving has been strongly required recently.

Meanwhile, in addition to those being classified with a locking-spring type like above, one utilizing a ratchet mechanism has been conventionally known heretofore publicly, ratchet mechanism which is utilized to allow the armrest body to rotate upward but to prohibit it from rotating downward.

For example, ratchet-style armrest devices of this sort are disclosed in Patent Literature No. 4 and Patent Literature No. 5.

One being classified with this type comprises: an armrest body to be installed rotatably upward/downward with respect to a seat at the base end; a ratchet mechanism comprising stationary-side first ratchet teeth being disposed around the axial line of the rotation of the armrest body, and movable-side second ratchet teeth being disposed in such a state as facing the first ratchet teeth as well as in such a state as rotating integrally with the armrest body, meshing with the first ratchet teeth so as to be inhibited from moving in the downward rotary direction of the armrest body, and getting over the first ratchet teeth so as to be movable in the upward rotary direction thereof; and an urging member for urging the first ratchet teeth and second ratchet teeth in such a direction as they press one another; wherein an angular position upon making use of the armrest body is made adjustable by means of that ratchet mechanism.

This armrest device is moreover equipped with the following: a releasing mechanism for separating the first ratchet teeth and second ratchet teeth away from each other so as to release the meshing; a retaining mechanism for retaining the first ratchet teeth and second ratchet teeth, which have been separated away from each other, in a separated state, thereby allowing the downward rotation of the armrest body; and a returning mechanism for undoing the retainment by means of the retaining mechanism to relatively move the first ratchet teeth in such a direction as approaching the second ratchet teeth, thereby returning them to the meshing.

By doing thusly, it becomes feasible to change the angular position of the armrest body from an upper-side position to a lower-side position, and hence to adjust it.

In the case of an armrest device being classified with this ratchet style, it is feasible to make the armrest device lightweight compared with one being classed with the aforementioned locking-spring style, because it is not necessary to use any metallic locking spring whose weight is heavy compared with one being classified with a locking-spring style; moreover, because it is feasible to make a member comprising the first ratchet teeth and another member comprising the second ratchet teeth of resin, respectively (making these of resin is disclosed in Patent Literature No. 4).

However, in the case of conventional armrest devices being classified with a ratchet style of this sort, involving those being disclosed in these Patent Literature No. 4 and Patent Literature No. 2, since a ratchet member comprising the stationary-side first ratchet teeth, and another ratchet member comprising the movable-side second ratchet teeth are constituted of distinctive members, which are made separately from or independently of the armrest, respectively, they have problems like below that come with this construction.

Specifically, the quantity of component parts gets greater because a first ratchet member and a second ratchet member are needed as those for constituting the ratchet mechanism, respectively. Moreover, since the drawback results in entailing an assembly step of assembling one of the ratchet members with the armrest body, the required assembly man-hour requirement has got greater, and thereby costs have become higher as being accompanied by this drawback.

Furthermore, since a large load, which is applied to the armrest, acts onto the assembled section when assembling one of the ratchet members with and then fixing it to the armrest body, the connection strength at the assembled section should be of high strength.

In order to do that, it is effective to make the armrest body and one of the ratchet members as a fit-combined structure so as to receive forces physically at the fit-combined section. However, if such is the case, since a structure for fitting them together, and a space for that should be provided, these drawbacks entail such a drawback that the assembled section has become large-sized between the ratchet mechanism and the armrest body.

In addition, if rattling should have occurred at the assembled section when such an assembly structure is made, there might possibly arise such a fear that the armrest body rattles about when a user applies a load to the armrest body.

Then, that drawback has hindered the armrest body from moving smoothly, and moreover has deteriorated the feeling of using the resulting armrest.

Patent Literature No. 1: Japanese Patent Gazette No. 4,089, 386;
Patent Literature No. 2: Japanese Patent Gazette No. 4,094, 421;
Patent Literature No. 3: Japanese Patent Gazette No. 4,087, 635;
Patent Literature No. 4: Published Japanese Translation of PCT Application Gazette No. 2003-520, 156; and
Patent Literature No. 5: Japanese Unexamined Patent Publication (KOKAI) Gazette No. 2007-283, 908

DISCLOSURE OF THE INVENTION

Assignment to be Solved by the Invention

In view of the circumstances like above as the background, the present invention is one which has been completed while aiming at providing an armrest device that is lightweight as a whole, which can also be made with less assembly man-hour requirements, which can also offer a favorable feeling of use, and which is inexpensive and small in size.

Means for Solving the Assignment

Therefore, a subject matter according to aspect 1 is characterized in that:
it comprises:
(a) an armrest body to be installed with respect to a seat rotatably upward/downward at the base end;
(b) a ratchet mechanism comprising stationary-side first ratchet teeth being disposed around the axial line of the rotation of the armrest body, and movable-side second ratchet teeth being disposed in a state of facing the first ratchet teeth and in a state of rotating integrally with said armrest body, meshing with the first ratchet teeth to be kept from moving in the downward rotary direction of the armrest body, and being capable of moving to get over the first ratchet teeth in the upward rotary direction of the armrest body;
(c) an urging member for urging said first ratchet teeth and second ratchet teeth in such a direction that they press one another;
(d) a releasing mechanism for separating the first ratchet teeth and second ratchet teeth away from each other, thereby releasing the meshing therebetween;
(e) a retaining mechanism for retaining the first ratchet teeth and second ratchet teeth, which have been separated away from each other, in the separated state, thereby allowing said armrest body to rotate downward; and
(f) a returning mechanism for undoing the retainment by means of the retaining mechanism, thereby moving the first ratchet teeth relatively in such a direction that they approach the second ratchet teeth and then returning the first ratchet teeth and second ratchet teeth to the meshing;
whereby it is made into such an armrest device that an angular position of the armrest body is made adjustable at the use position by means of said ratchet mechanism; and
not only said first ratchet teeth are formed on a ratchet member that is made separately from and independently of said armrest body, but also the armrest body is made of resin and said second ratchet teeth are molded integrally with the armrest body at the time of molding the armrest body.

A subject matter according to aspect 2 is characterized in that:

not only the urging member urges said stationary-side ratchet member toward said second ratchet teeth on said armrest;
but also said releasing mechanism comprises a releasing cam unit being molded integrally with said armrest body, thereby rotating the releasing mechanism integrally with said armrest body and then pushing up said ratchet member axially against an urging force of said urging member when the armrest body has arrived at the use-range upper limit, in order to separate said first ratchet teeth away from said second ratchet teeth; and
said retaining mechanism is made into one which retains the ratchet member, which has been pushed up, at the push-up position, thereby allowing said armrest body to rotate downward from the use-range upper limit.

A subject matter according to aspect 3 is characterized in that:
said retaining mechanism comprises:
a flanged portion that is disposed on said ratchet member in such a form as extending around said axial line; and
a claw member being put in place on an axially opposite side with respect to said second ratchet teeth by way of said ratchet member; and
the claw member is provided with an elastic claw that protrudes axially toward the ratchet member to serve as a retaining unit, thereby making the retaining mechanism into one in which said flanged portion is hook locked and then retained by a leading-end side clawed portion after the elastic claw deforms elastically to let the flanged portion pass axially with respect to the clawed portion at the time of pushing up the ratchet member.

A subject matter according to aspect 4 is characterized in that:
said elastic claw is disposed in a plurality of pieces in a circumferential direction along said flanged portion, thereby being made so as to retain the flanged portion at a plurality of locations.

A subject matter according to aspect 5 is characterized in that:
said ratchet member is made of resin, and thereby said first ratchet teeth and said flanged portion are molded integrally with said ratchet member.

A subject matter according to aspect 6 is characterized in that:
said claw member is made into one which rotates integrally with said armrest body; and
said returning mechanism comprises a cut-off that is formed in said flanged portion, and which lets said clawed portion of said elastic claw pass axially when said armrest body has arrived at the rotational lower limit, thereby undoing the retainment of the flanged portion by means of the elastic claw and then making the ratchet member movable toward said second ratchet teeth.

A subject matter according to aspect 7 is characterized in that:
a lid member makes said claw member, the lid member being disposed in such a state that it covers said ratchet mechanism from one of the axially opposite-end sides and in such a state that it rotates integrally with said armrest body; and
the lid member is made of resin, and thereby said elastic claw is molded integrally with the lid member.

A subject matter according to aspect 8 is characterized in that:
it further comprises an axial supporter being installed to said seat, thereby supporting said armrest body rotatably;
wherein said ratchet member is formed as a ring shape;

said ratchet member is assembled with said axial supporter so that said ratchet member is made stationary in the rotational direction but movable relatively in the axial direction with respect to said axial supporter by means of irregular fitting between a guide projection and a guide dent at least any one of which extends axially;

a cylindrical housing is molded integrally at said base end of said armrest body;

said axial supporter and said ratchet member are accommodated inside the housing;

said second ratchet teeth are molded on a bottom inner face that faces axially in the housing, whereas said first ratchet teeth are formed on an axial end face of the ratchet member that faces the second ratchet teeth; and an opened portion, which is on an opposite side axially with respect to the bottom inner face of the housing, is closed by a lid member being made of resin that rotates integrally with said armrest body.

A subject matter according to aspect 9 is characterized in that:

said lid member is provided with a hooking claw that protrudes axially, the hooking claw being fit combined with respect to an outer peripheral face at an axial end of said axial supporter in an outwardly fit state that is accompanied by diametrically-outward elastic deformation, and locking diametrically inward with a locked portion on an outer peripheral face of the axial supporter; and the hooking claw is made into one which is fit internally in a non-idly fit state to an inner peripheral face at an axial end of said housing that is present on a side of the lid member.

Effect of the Invention

As described above, the present invention is one in which the stationary-side first ratchet teeth are formed on a ratchet member that is made separately from and independently of the armrest body, whereas the armrest body is made of resin and the second ratchet teeth are molded integrally with that resinous armrest body at the time of molding the armrest body.

Therefore, in accordance with the present invention, it is not necessarily required to provide a member for the second ratchet teeth separately from and independently of the armrest body. Thus, not only it is possible to make the quantity of components part, which are required for an armrest device, less, but also it is not needed to assemble that member comprising the second ratchet teeth with the armrest body in a state of rotating integrally with the armrest body, thereby making it possible to cut down the assembly man-hour requirement on that occasion.

Thus, it is possible to reduce the required costs for an armrest device.

Moreover, since it is not needed to assemble a ratchet member comprising the second ratchet teeth with the armrest body, it cannot be needed to provide a fit structure for the assembly, either. Therefore, a space for that assembly can also be cut down, and so it is possible to downsize the assembled section between the ratchet mechanism and the armrest body.

In the present invention, it is possible to make an armrest device lightweight as a whole remarkably, because the armrest body, which occupies a major portion of the armrest device, is made of resin.

In addition, since it is not needed to form the second ratchet teeth on a member that is made separately from and independently of the armrest body, a member for the second ratchet teeth, and furthermore a fastening member for fastening that member can be cut back, and hence it is possible to intend weight saving much more.

In addition to above, the following advantages are obtainable by means of integrally molding the second ratchet teeth directly onto the armrest body in compliance with the present invention.

When a user uses an armrest, that is, when he or she leans the body weight against the armrest, a large load is applied onto the armrest body. Therefore, in a case where the armrest is made of resin, it comes to use a high-strength one as that resin.

The load being applied to the armrest body comes to be applied as it is onto the second ratchet teeth that are molded integrally with the armrest body.

In this case, if the strength of the second ratchet teeth is weak, it comes to be impossible to secure sufficient reliability from a viewpoint of strength, because there might possibly be such fears that ruptures have arisen in the second ratchet teeth or cracks have occurred in them. However, since those second ratchet teeth are formed of high-strength resin that constitutes the armrest body, it is possible for the second ratchet teeth to be of high strength sufficiently.

Moreover, unlike the case where a separate and independent member comprising the second ratchet teeth is assembled with an armrest body, there is no such a problem that rattling has been caused to arise at that assembled section. So, it is possible to secure smooth movements for an armrest by making the armrest free of rattling about at the time of use, and furthermore it is possible to enhance its feeling of use.

Next, aspect 2 is one which is set up as follows: not only the ratchet member comprising the stationary-side first ratchet teeth is urged by the urging member toward the second ratchet teeth on the armrest body; but also the aforementioned releasing mechanism is made into one which comprises a releasing cam unit being molded integrally with the armrest body, thereby rotating the releasing mechanism integrally with the armrest body and then pushing up the ratchet member axially against an urging force of the urging member when the armrest body has arrived at the use-range upper limit, in order to separate the first ratchet teeth away from the second ratchet teeth; and the aforementioned retaining mechanism is made into one which retains the ratchet member, which has been pushed up, at the push-up position, thereby allowing the armrest body to rotate downward from the use-range upper limit.

In accordance with this aspect 2, rotating the armrest body upward up to the use-range upper limit makes it possible to automatically release the meshing between the first ratchet teeth and the second ratchet teeth by means of the action of the releasing cam unit.

Moreover, since the retaining mechanism retains the ratchet member, which has been pushed up, at the push-up position, pushing up the armrest body up to the use-range upper limit makes it possible to operate the armrest body so that it rotates freely downward thereafter.

In this aspect 2, it is possible to constitute the releasing mechanism with a simple structure, because the releasing mechanism is one which pushes up the ratchet member axially, thereby releasing the first ratchet teeth and the second ratchet teeth, which mesh with each other in the rotational direction around the axial line, from the meshing.

Moreover, since the releasing cam unit is molded integrally with the armrest body, it cannot be needed to separately and specially provide the armrest body with a member for the releasing cam unit. Hence, it is possible to further reduce the quantity of required component parts and the assembly man-hour requirements. In addition, this setup is accompanied by making it possible to reduce required costs for an armrest device much more.

Next, aspect 3 is one which is set up as follows: the aforementioned retaining mechanism is made into one which comprises: a flanged portion that is disposed on the ratchet member in such a form as extending around the axial line; and a claw member being put in place on an axially opposite side with respect to the second ratchet teeth by way of the ratchet member; and the claw member is provided with an elastic claw that protrudes axially toward the ratchet member to serve as a retaining unit, thereby making the retaining mechanism into one in which the flanged portion is hook locked and then retained by a leading-end side clawed portion after the elastic claw deforms elastically at the time of pushing up the ratchet member.

By means of setting up the retaining mechanism thusly, it is possible to simply retain the ratchet member, which has been separated from and then pushed up from the second ratchet teeth by means of the releasing cam unit, at the use-range upper limit of an armrest, with the resulting ratchet mechanism, and so it is possible to readily constitute that retaining mechanism with a simplified structure.

Moreover, since this retaining mechanism is one in which the elastic claw is protruded axially to retain the ratchet member axially, the setup has such an advantage that the structure does not at all become large-sized diametrically due to the retaining mechanism.

In this instance, it is possible to dispose the aforementioned elastic claw in a plurality of pieces in a circumferential direction along said flanged portion, thereby being made so as to retain the flanged portion at a plurality of locations.

By doing thusly, it is possible to retain the flanged portion at a plurality of locations because putting the retainment of the flanged portion by means of the elastic claw in a cantilevered state is avoided, unlike the case where the elastic claw is disposed at a single location alone in the circumferential direction.

It is possible to make the aforementioned ratchet member of resin, and thereby the first ratchet teeth and the flanged portion are molded integrally with the ratchet member.

By doing thusly, it is possible to make the quantity of required component parts less, compared with the case where a separate and independent member is assembled with the ratchet member and then the resulting one is provided with the flanged portion. Moreover, it is possible to reduce the assembly man-hour requirements much more.

Furthermore, it is possible to make an armrest device lightweight much more by making the ratchet member of resin.

In this instance, it is possible to set up the claw member into one which rotates integrally with the armrest body, and moreover it is possible to set up the aforementioned returning mechanism into one which comprises a cut-off that is formed in the flanged portion, and which lets the clawed portion of the elastic claw pass axially when the armrest body has arrived at the rotational lower limit, thereby undoing the retainment of the flanged portion by means of the elastic claw and then making the ratchet member movable toward the second ratchet teeth.

By doing thusly, it is possible to make the armrest body movable downward by means of the retaining mechanism, whereas it is possible to automatically return the ratchet mechanism to the meshing where that armrest body has arrived at the rotational lower limit.

Moreover, the setup not only makes it possible to constitute the returning mechanism with a simple structure, but also has such an advantage that the structure does not at all become large-sized diametrically due to the resultant returning mechanism, because this returning mechanism is also one which lets the clawed portion of the elastic claw pass axially with respect to the flanged portion to carry out the returning action.

Aspect 7 is one which is set up as follows: disposing a lid member, which rotates integrally with the armrest body, in such a state that it covers the ratchet mechanism from one of the axially opposite-end sides; making that lid member of resin, thereby molding the elastic claw integrally with this lid member; and making such a lid member serve the aforementioned claw member dually.

In accordance with this claim 7, not only it is possible to cut down the quantity of component parts as well as the assembly man-hour requirements because it is not needed to provide the claw member separately from and independently of the lid member, but also it is possible to intend making an armrest device lightweight much more because the lid member is also made of resin.

Furthermore, it is possible to have the elastic claw possess ample elastic-deformation capability by integrally molding the elastic claw with this lid member being made of resin.

In the present invention, the armrest device can be set up as follows: assembling the ratchet member being formed as a ring shape with respect to an axial supporter to be installed to the seat in a stationary manner in the rotational direction but in a relatively movable manner in the axial direction by means of irregular fitting; moreover, molding a cylindrical housing integrally at the base end of the armrest body that is made of resin, thereby accommodating the axial supporter and the ratchet member inside that housing; further, molding the second ratchet teeth on a bottom inner face that faces axially in the housing; moreover, forming the first ratchet teeth on an axially facing end face of the ratchet member; in addition, closing an opened portion, which is on an opposite side axially with respect to the bottom inner face of the housing, by a lid member being made of resin that rotates integrally with the armrest body.

By doing thusly, it is possible to put the ratchet mechanism and the axial supporter inside the housing that is formed at the base end of the armrest body.

In this instance, it is possible to provide the lid member with a hooking claw that protrudes axially, the hooking claw being fit combined with respect to an outer peripheral face at an axial end of the axial supporter in an outwardly fit state that is accompanied by diametrically-outward elastic deformation, and locking diametrically inward with a locked portion on an outer peripheral face of the axial supporter, and to make that hooking claw into one which is fit internally in a non-idly fit state to an inner peripheral face at an axial end of the housing that is present on a side of the lid member.

By setting up the lid member thusly, it becomes feasible to fix the lid member with respect to the axial supporter in a state of being kept from coming off from the axial supporter, and at the same time in a state of rotating integrally with the armrest body, when the axial supporter is fixed toward the seat with a bolt, and the like.

That is, it becomes feasible to automatically fix the lid member in a state of being kept from coming off from the axial supporter by fixing the axial supporter, without ever using any separate and independent fixture, such as a bolt, for fixing the lid member individually.

In this aspect 9, in order that the lid member comes off axially from the axial supporter, it is required that the hooking claw undergo elastic deformation to expand diametrically outward. However, the axial end of the housing is positioned on an outer peripheral side of that hooking claw, thereby making a wall. Since the resulting wall hinders the hooking claw from undergoing elastic deformation diametrically outward, fixing the axial supporter simultaneously results in fixing the lid member to the axial supporter in a state of being kept from coming off from the axial supporter.

BRIEF DESCRIPTION OF THE DRAWINGS

FIG. 2 is a diagram in which an armrest body and a position adjusting device in the same embodiment mode are illustrated in the state of external appearance;

FIG. 3 is an exploded perspective diagram for the armrest device according to the same embodiment mode;

FIG. 5 is the "V"-V" cross section in FIG. 2;

EXPLANATION ON REFERENCE NUMERALS

Figure 1A:
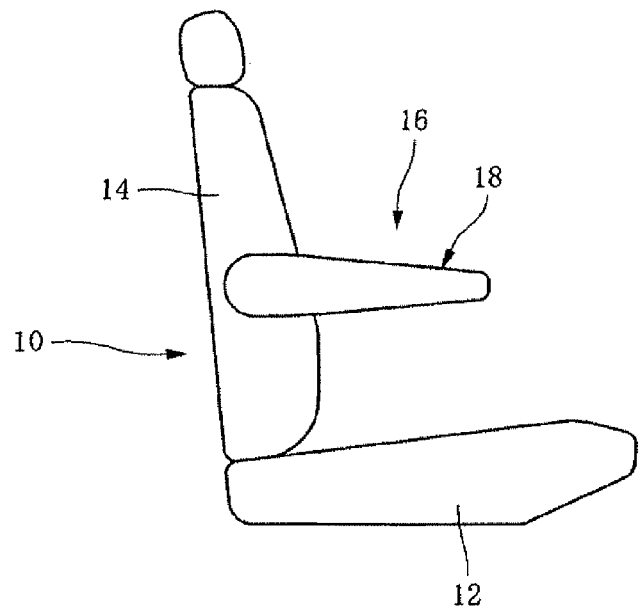
FIG. 1 is diagrams in which an armrest device according to one of embodiment modes according to the present invention is illustrated in the installation state to a seat of automobile.

10: Seat;
16: Armrest Device;
18: Armrest;
20: Armrest Body;
22: Angle Adjusting Device;
32: Housing;
34: Bottom;
36: Opening;
38: Axial Supporter;
40: Ratchet Member;
42: Lid Member;
66: Projected Streak;
68: Dented Streak;
70: Coiled Spring (i.e., Urging Member);
78: Locked Portion;
80: First Ratchet Teeth;
82: Second Ratchet Teeth;
96A: Hooking Claw;
98, and 114: Clawed Portions;
104: Releasing Cam Unit;
108: Driven Cam Unit;
112: Elastic Claw;
116: Flanged Portion; and
118: Cut-off

BEST MODE FOR CARRYING OUT THE INVENTION

Subsequently, an embodiment mode according to the present invention will be explained in detail based on the drawings.

In FIG. 1, 10 is a seat of automobile, 12 is the seated portion, 14 is the seat back, and 16 is an armrest device that is installed to that seat back 14.

18 is an armrest making a major part of that armrest device 16. The armrest 18 is made herein so that the angular position at the time of use (hereinafter simply labeled as "angle") is adjustable between the substantially-horizontal rotational lower limit shown in FIG. 1(A) and the use-range upper limit shown in FIG. 1(B) where the armrest 18 rotates upward by an angle α (e.g., by 60° herein) beyond the former.

The armrest device 16 includes an armrest body 20 (see FIG. 2, and FIG. 3) serving as a core, a reinforcement member that is buried inside the armrest 18, a not-shown elastic material covering the armrest body 20 from the outside, and an angle adjusting device 22 being built into the base end on the root side of the armrest body 20.

Here, the angle adjusting device 22 not only supports the armrest body 20 rotatably, but also has a function of adjusting the angle in the upward/downward rotational direction.

The armrest body 20 is one which is made of resin (e.g., glass-fiber-reinforced polypropylene resin herein). As illustrated in FIG. 3, it has a peripheral wall 24 and a side wall 26, thereby making a hollow structure with a form whose right-side face in FIG. 3 is opened. That hollowed portion is provided with reinforcement ribs 28 by integral molding.

Note that 30 is an injection hole for a raw-material liquid upon molding the aforementioned elastic material (e.g., a polyurethane material herein).

At the base end of this armrest body 20, a cylindrical housing 32 is molded integrally.

And, the aforementioned angle adjusting device 22 is accommodated inside this housing 32.

Figure 4:
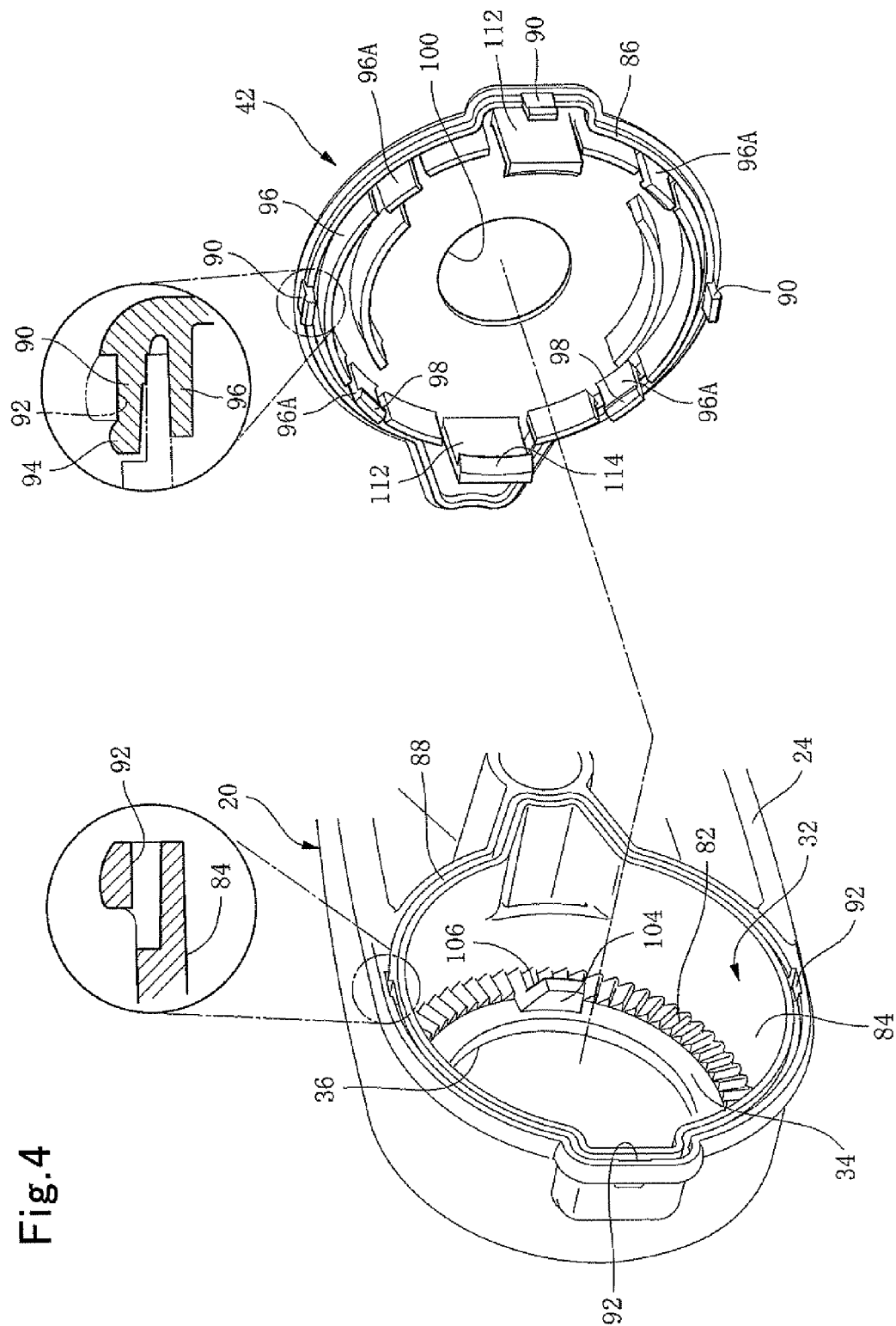
FIG. 4 is a diagram in which a part of FIG. 3 is illustrated in an enlarged manner.

This housing 32 has a bottom 34 at the axial end on the left side in FIG. 3 and FIG. 4. A circular opening 36 is formed in the bottom 34.

Moreover, the axial end on the right side in the drawings is formed as an opened configuration as a whole.

The aforementioned angle adjusting device 22 comprises an axial supporter 38 supporting the armrest body 20 rotatably and being formed as a cross-sectionally circular block shape, and a ratchet member 40 being formed as a circular ring shape and being fit-combined to the axial supporter 38 in an outwardly fit state; and those are accommodated inside the housing 32.

Moreover, the housing 32's opened portion at the axially end on the right side in the drawings is closed with a lid member 42 that rotates integrally with the armrest body 20.

These axial supporter 38, ratchet member 40, and lid member 42 are also made of resin.

As resin for constituting the axial supporter 38 and ratchet member 40, glass-fiber-reinforced polypropylene resin (or GFPP) is used herein.

Meanwhile, as resin for constituting the lid member 42, polyacetal resin (or POM) is used.

As illustrated in FIG. 5, the axial supporter 38 comprises a bolt insertion hole 44, which penetrates axially, at the central part, and is fastened and then fixed toward the seat back 14 by way of a fixing plate 48 by means of a bolt 46 at that bolt insertion hole 44 (A rotational detent mechanism between the fixing plate 48 and the seat back 14 shall be abbreviated herein). Note that, an the present embodiment mode, although the fixing plate 48 is set forth as a component part for the armrest device 16, it is even fine to have a component part the seat back 14 possess the same function as that of the fixing plate 48.

As illustrated in FIG. 3, the axial supporter 38 comprises a minor-diameter portion 50 on the axially left-end side in the drawing, and further an intermediate-diameter portion 52 following this minor-diameter portion 50, and moreover a major-diameter flanged portion 54 following the intermediate-diameter portion 52.

That minor-diameter portion 50 is provided with positioning grooves 56 at predetermined intervals in the circumferential direction.

Meanwhile, the aforementioned fixing plate 48 being made of metal is provided with a plurality of positioning protrusions having a cut-and-erected configuration at positions that correspond to the positioning grooves 56. These positioning protrusions 58 are fit into the positioning grooves 56, and thereby the fixing plate 48 positions the axial supporter 38 in the rotational direction.

Note that the fixing plate 48 is provided with a through hole 60 at the central part. This through hole 60 is one for inserting the bolt 46 thereinto.

As illustrated in FIG. 5, a slip ring 62 being made of resin (being made of polyacetal herein) is also fit around the minor-diameter portion 50.

As illustrated in FIG. 3, the slip ring 62 is formed as a circular ring shape having a form that is divided at a predetermined location in the circumferential direction. As illustrated in FIG. 5, its cross-sectional configuration is formed as a letter-"U" configuration, and a circularly-annular groove 64 going over the whole circumference is formed at the axially middle section.

And, an inner-peripheral end 65 in a bottom 34 of the housing 32 is fitted into that groove 64 diametrically.

That is, the inner-peripheral end 65 is fit combined onto the outer peripheral face of the minor-diameter portion 50 of the axial supporter 38 by way of the slip ring 62, and thereby the inner-peripheral end 65 is supported rotatably with the axial supporter 38.

The outer peripheral face of the aforementioned intermediate-diameter portion 52 in the axial supporter 38 is provided with projected streaks 66 extending axially at predetermined intervals in the circumferential direction.

Meanwhile, the ratchet member 40 being formed as a circular ring shape is provided with dented streaks 68, which correspond to the projected streaks 66, at predetermined intervals in the circumferential direction in the inner peripheral face. The ratchet member 40 is fit combined with respect to the intermediate-diameter portion 52 in the axial supporter 38 in such a state that these dented streaks 68 and projected streaks 66 undergo irregular fitting together, and in an outwardly fit state of being stationary in the rotational direction but being movable relatively in the axial direction.

Metallic coiled springs (i.e., urging members) 70, which are arranged at four locations for every 90° in the circumferential direction, are interposed between an axial end of that ratchet member 40 and the major-diameter flanged portion 54 of the axial supporter 38. The ratchet member 40 is urged by means of these coiled springs 70 leftward in FIG. 3.

Here, the coiled springs 70 are plugged in plug-in holes 72 of the ratchet member 40 on the left-end side in the drawing, and moreover they are fit combined with protrusions 74, with which the flanged portion 54 of the axial supporter 38 is provided, on the right-end side, and thereby they are positioned in the rotational direction.

As illustrated in FIG. 5, the flanged portion 54 of the axial supporter 38 is provided with a circular erected portion 76 that stands up axially from the outer peripheral end.

Moreover, the outer peripheral side is provided with a locked portion 78 with a stepwise configuration being formed as a circularly-annular shape that continues in the circumferential direction.

One of the axially end faces of the ratchet member 40, the axially left-side end face in FIG. 3, is provided with stationary-side first ratchet teeth 80 being formed as a sawtooth shape by means of integral molding continuously over the whole circumference.

Moreover, corresponding to above, the inner face of the aforementioned bottom 34 in the armrest body 20 is provided with sawtooth-shaped movable-side second ratchet teeth 82, which face axially with respect to these first ratchet teeth 80, continuously over the whole circumference.

Here, the second ratchet teeth 82 are those which have been molded integrally with the armrest body 20 at the time of molding the armrest body 20.

In this embodiment mode, a ratchet mechanism is constituted by means the second ratchet teeth 82, and the ratchet member 40 that is equipped with the first ratchet teeth 80.

This ratchet mechanism acts as follows.

Figure 9A:
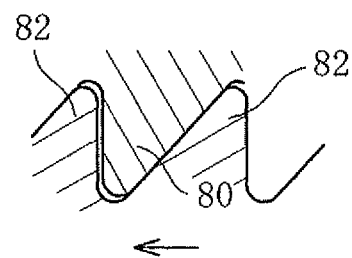
FIG. 9 is diagrams for explaining the actions of ratchet teeth and a cam unit according to the same embodiment mode.
Figure 9B:
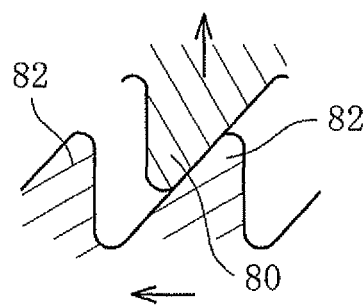
Figure 9C:
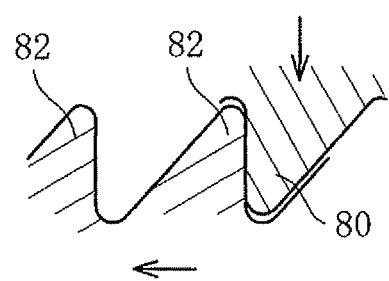

Specifically, when the armrest body 20 tries to rotate upward from the rotational lower end shown in FIG. 1(A), the movable-side second ratchet teeth 82, which are molded integrally on the armrest body 20, can move to get over the stationary-side first ratchet teeth 80, which are usually put in a state of being unable to rotate, that is, which are formed on the ratchet member 40, as illustrated in FIGS. 9(A) through 9(C) (on this occasion, the ratchet member 40 moves axially rearward toward the flanged portion 54 of the axial supporter 38) while letting the coiled springs 70 undergo elastic compressive deformation, and thereby this operation allows the armrest body 20 to rotate upward.

On the other hand, when the armrest body 20 tries to rotate downward, the movable-side second ratchet teeth 82 and the stationary-side first ratchet teeth 80 are put in a state of meshing with each other, thereby hindering the second ratchet teeth 82 from rotating. And, the armrest body 20 is prohibited from rotating downward by means of this action.

Note that the armrest body 20 undergoes the rotational movement in such a state that a fit-combined walled portion 84 of the housing 32 is fit outwardly to the ratchet member 40, as illustrated in FIG. 5.

The lid member 42, which closes the opened portion in the housing 32, comprises an annular rib 86, which protrudes axially by a minute height, along the outer peripheral rim, as illustrated in FIG. 4. This rib 86 is fit into a corresponding shallow annular groove 88, which is formed in an axial end face of the housing 32 (i.e., the top end face in FIG. 5), and thereby the lid member 42 is positioned with respect to the housing 32.

The rib 86 comprises protruding portions 90, which protrude partially, at three locations in the circumferential direction. These protruding portions 90 are plugged into holed portions 92, with which the housing 32 is provided so as to correspond to the protruding portions 90.

These protruding portions 90 comprise an engaging portion 94 at the leading end, respectively. This engaging portion 94 is caused to engage with the circumferential edge of the holed portion 92.

Figure 8A:
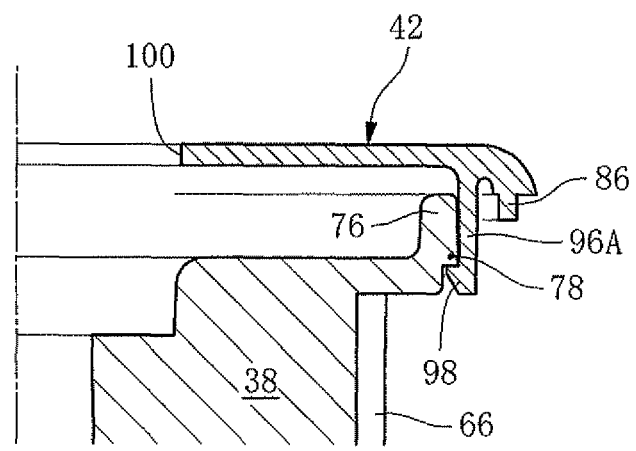
FIG. 8 is diagrams for explaining the actions of respective parts of a lid member in the same embodiment mode.
Figure 8B:
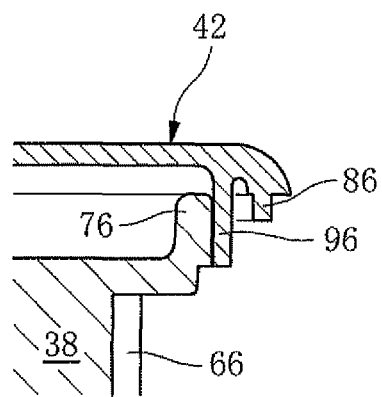

On a diametrically inner side to the rib 86, the lid member 42 is provided with a fit-combined tongue 96, which protrudes axially more than does the rib 86, by integral molding annularly. And, this fit-combined tongue 96 is fit with an axially end of the axial supporter 38 that is present on a side of the lid member 42, more specifically, with the outer peripheral face of the aforementioned erected portion 76, as illustrated in FIG. 8(B), in a non-idly fit state as well as in an outwardly fit state.

This fit-combined tongue 96 is divided partially into parts in the circumferential direction, and the resulting parts are thereby made into hooking claws 96A that are elastically deformable diametrically, respectively.

The hooking claws 96A fit with the outer peripheral surface of the erected portion 76 of the axial supporter 38 in a contact state in the same manner as the other segments of the fit-combined tongue 96.

These hooking claws 96A comprise a clawed portion 98 at the leading end, respectively. As illustrated in FIG. 8(A), the lid member 42 is attached to the axial supporter 38 by means of hooking these clawed portions 98 with the aforementioned locked portions 78 of the axial supporter 38.

Note that these hooking claws 96A are disposed at four locations that are present at intervals of every 90° along a circumferential direction.

Figure 8C:
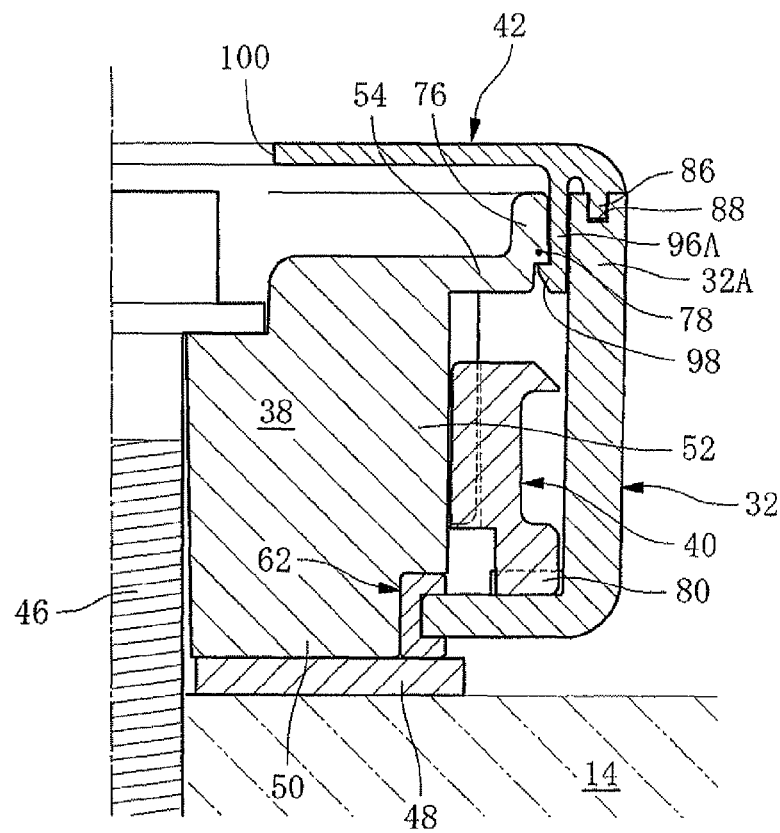
Figure 8D:
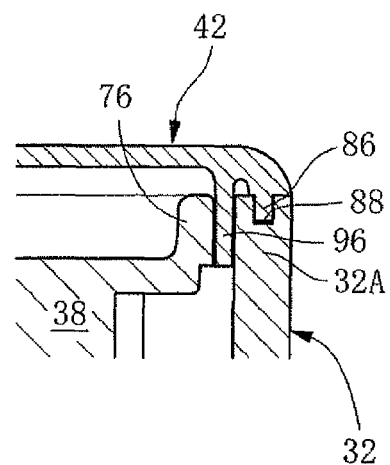

The fit-combined tongue 96 including these hooking claws 96A is fit inwardly to the inner peripheral surface of an axially end 32A of the housing 32 that is present on a side of the lid member 42 in a non-idly fit state, as illustrated FIG. 8(C) and FIG. 8(D), respectively. That is, the fit-combined tongue 96 including hooking claws 96A is held virtually free of any clearance between the erected portion 76 of the axial supporter 38 and the axial end 32A of the housing 32 in the diametrically inward/outward direction.

As a result, when the axial supporter 38 is fixed toward the seat back 14 with the bolt 46 going through the through hole 100 of the lid member 42 at the center under the condition that the lid member 42 is assembled with the axial supporter 38, the lid member 42 is simultaneously put in a state of being fixed rotatably to the axial supporter 38 under the condition that it is kept from coming off from the axial supporter 38 as well as under the condition that it rotates integrally with the armrest body 20.

In order to remove the lid member 42 upward in FIG. 5 and FIGS. 8(A)-(D), it is needed to remove clawed portions 98 from the locked portions 78 by elastically deforming the hooking claws 96A, which have elastic deformability, diametrically outward. However, as illustrate in FIG. 8(*c*), since the hooking claws 96A are in a state of being held between the erected portions 76 of the axial supporter 38 and the axial end 32A of the housing 32 free of any clearance, and since that axial end 32A makes a wall, the hooking claws 96A cannot elastically deform diametrically outward. Because of this, the engagement between the clawed portions 98 and the locked portions 78 is retained firmly.

Because the fit-combined tongue 96 of the lid member 42, which includes these hooking claws 96A, is held by and between the erected portion 76 of the axial supporter 38 and the axial end 32A of the housing 32 free of any clearance over the entire circumference, that is, because the clearance between the erected portion 76 and the end 32A of the housing 32 is buried by means of the fit-combined tongue 96, such an effect is also obtainable that the armrest body 20 is effectively inhibited from flexing when forces are applied to a leading-end side of the armrest body 20.

Figure 7A:
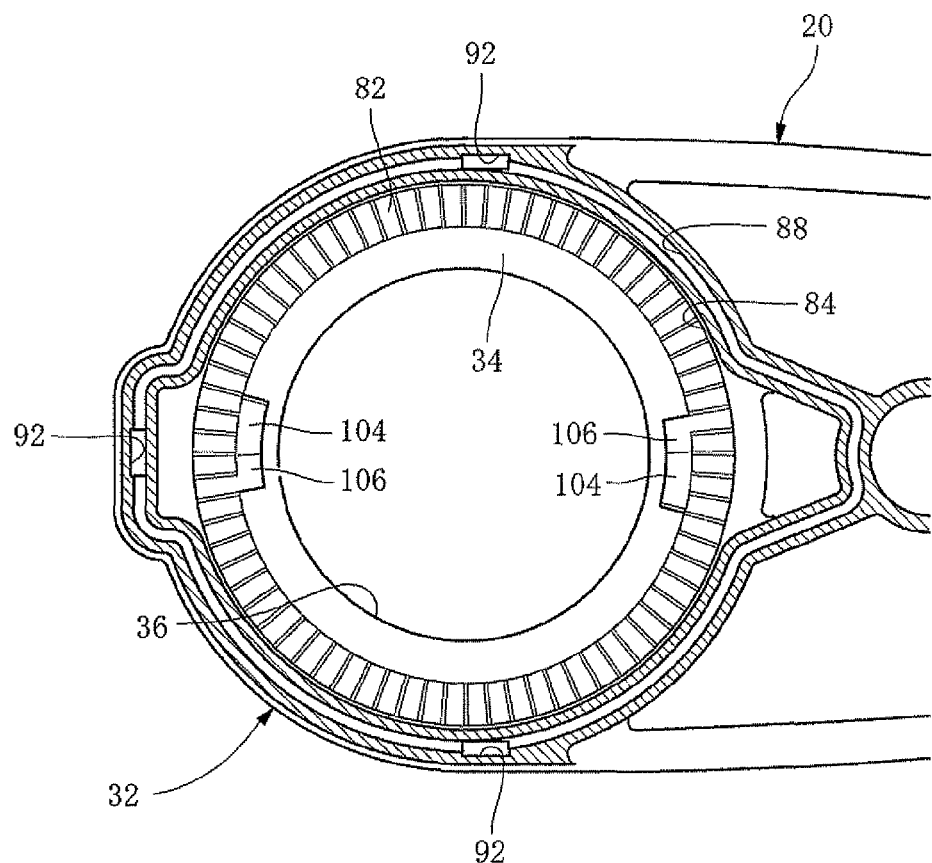
FIG. 7 is diagrams in which a major part of the armrest body in the same embodiment mode is illustrated in an enlarged manner.
Figure 7B:
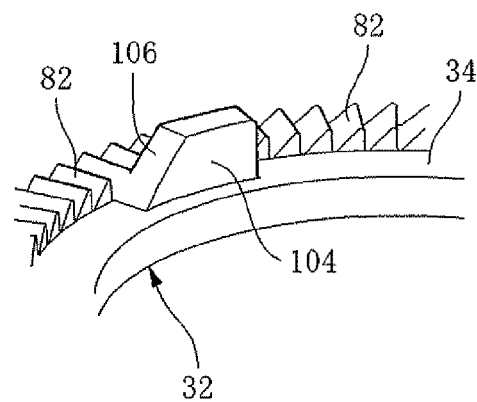

The bottom 34 of the aforementioned housing 32 is provided with releasing cam units 104, which are bent in a letter-"L" shape to axially protrude toward the ratchet member 40, by integral molding at two locations at a distance of 180° in the circumferential direction, as illustrated in FIG. 7(A) and FIG. 7(B).

These releasing cam units 104 are provided with a cam face 106 having an inclined configuration, respectively. When the armrest body 20 is rotated upward, that is, when the housing 32 rotates in the anticlockwise direction in FIG. 4, this cam face 106 makes a face having an inclined configuration that shifts from the base end toward the leading end in the opposite direction to that rotational direction.

On the other hand, the ratchet member 40 is also provided with a pair of corresponding driven cam units 108 at two locations at a distance of 180° in the circumferential direction, as illustrated in FIG. 6.

These driven cam units 108 are also provided with a cam face 110 having an inclined configuration, respectively.

These cam faces 110 are disposed in such a direction that faces the cam faces 106 of the releasing cam units 104 in the rotary direction, respectively, and are disposed in an identical inclination direction and with an identical inclination angle.

In this embodiment mode, a releasing mechanism that releases the meshing between the first ratchet teeth 80 and the second ratchet teeth 82 is constituted of the releasing cam units 104 and driven cam units 108.

These releasing cam units 104 and driven cam units 108 act as follows.

Figure 10A:
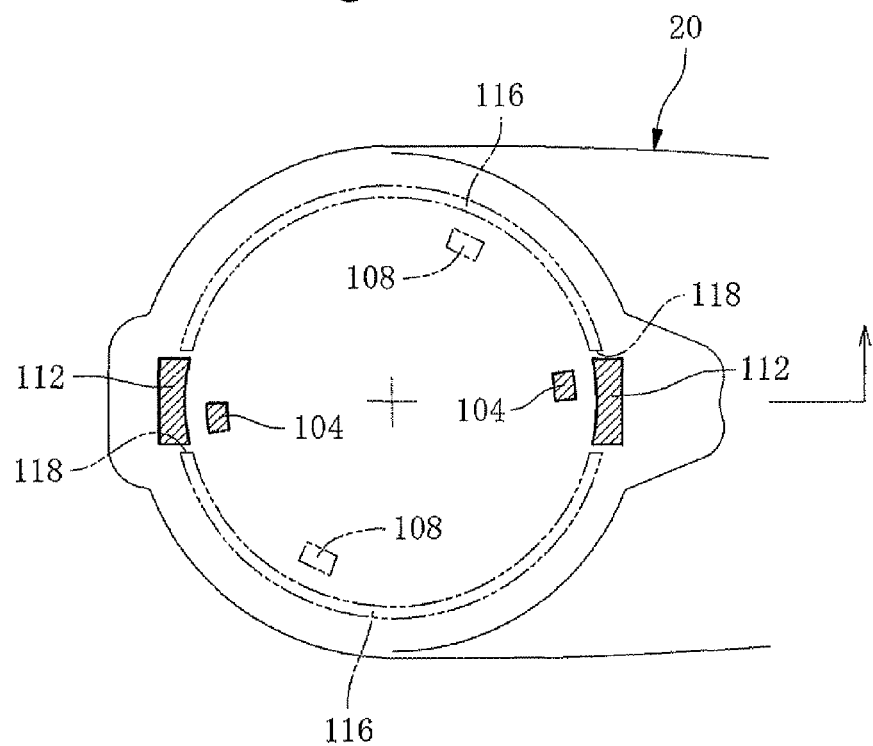
FIG. 10 is diagrams for explaining the actions of the armrest device according to the same embodiment mode.
Figure 10B:
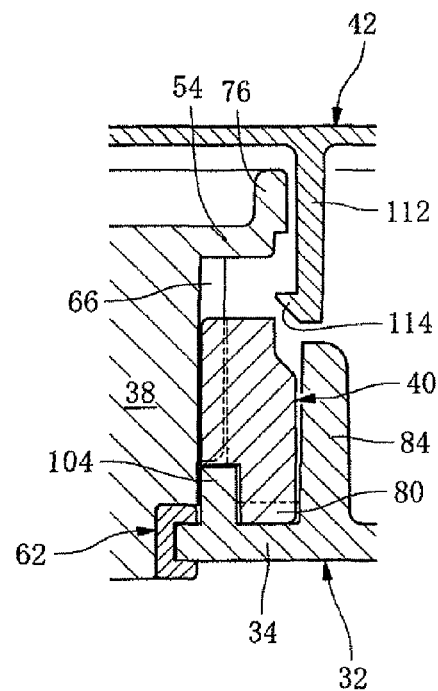
Figure 10C:
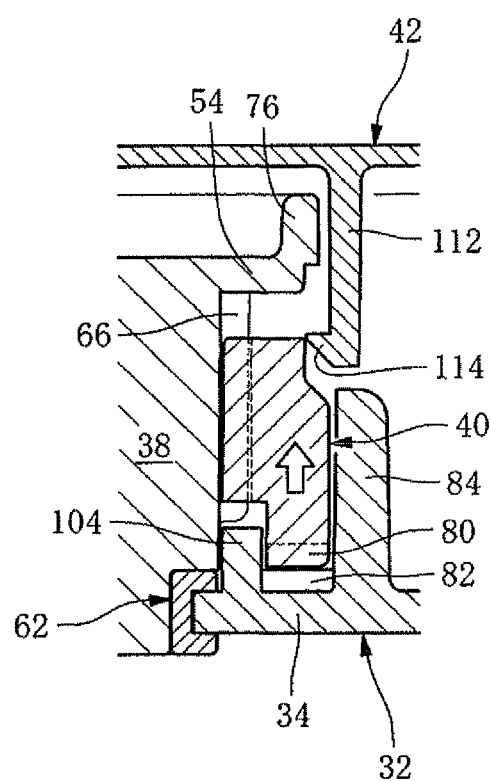

When the armrest body 20 is at the rotational lower limit shown in FIG. 1(A) so that it is placed at the virtually horizontal position, the releasing cam units 104 and the driven cam units 108 are placed at positions that are separated away from each other in the rotational direction, as illustrated in FIG. 10(A), more specifically, the releasing cam units 104 are placed at positions that are separated away from and with respect to those of the driven cam units 108 in the clockwise direction in FIG. 10(A).

When the armrest body 20 is operated to rotate upward under that circumstance, the releasing cam units 104 rotate in the anticlockwise direction in FIG. 10(A) to gradually approach the driven cam units 108.

Figure 9D:
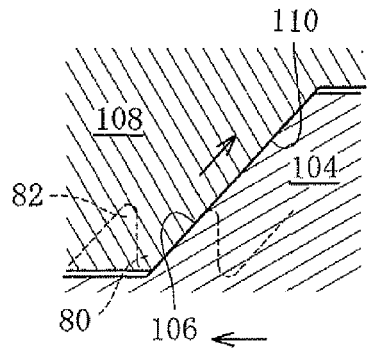
Figure 9E:
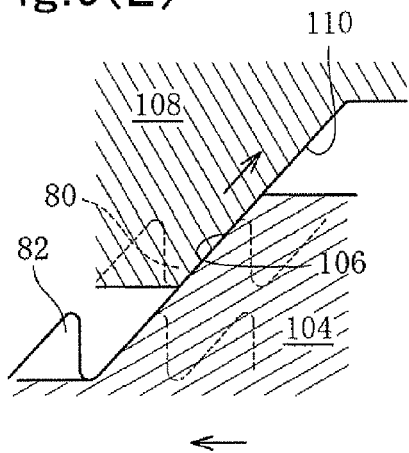
Figure 9F:
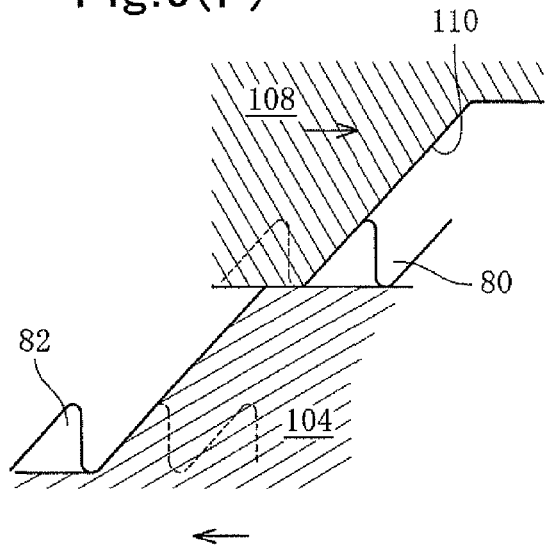
Figure 11A:
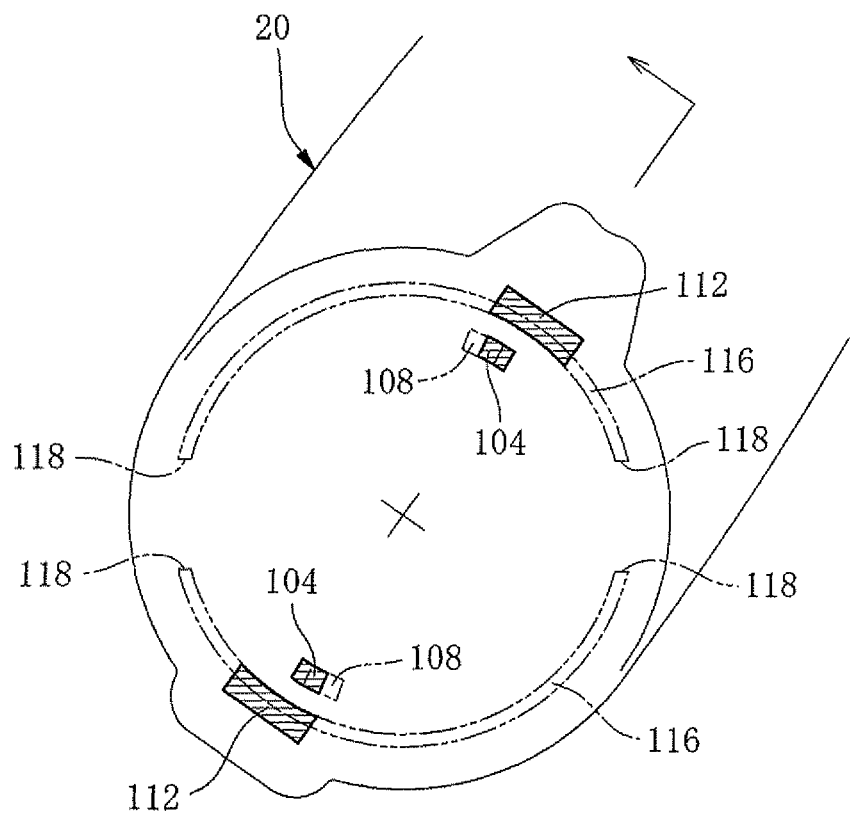
FIG. 11 is diagrams for explaining the actions that follow FIG. 10.

And, upon operating the armrest body 20 to rotate it immediately near to the use-range upper limit, each of the cam faces 106 of the paired releasing cam units 104 comes in contact with each of the cam faces 110 of the corresponding paired driven cam units 108, as illustrated in FIG. 11(A) and FIG. 9(D). Then, as illustrated in FIG. 9(E) and FIG. 9(F), the driven cam units 108 are pushed up by means of the cam action between the cam faces 106 and 110 in the axial direction upward in the drawings, as being accompanied by a further rotation of the armrest body 20. That is, the ratchet member 40 is pushed up against the urging forces of the coiled springs 70 in the axial direction upward in the drawings.

And, due to such an operation that the ratchet member 40 is pushed up axially, the meshing between the first ratchet teeth 80 and the second ratchet teeth 82 is released.

Then, the ratchet member 40, which have been pushed up, is retained at that pushed-up position by means of the retaining mechanism. That is, the first ratchet teeth 80, and the second ratchet teeth 82 are retained in such a state that they are released from the meshing.

As illustrated in FIG. 4 and FIG. 5, the aforementioned lid member 42 is provided with the elastic claws 112, which make parts of that retaining mechanism, at two locations at a distance of 180° in the circumferential direction. These elastic claws 112 are disposed on the lid member 42 by integral molding.

These elastic claws 112 are disposed respectively in such a configuration as protruding axially, and each of them is capable of elastically deforming diametrically.

Moreover, the respective leading ends are provided with an inwardly-directed clawed portion 114, respectively.

Figure 6A:
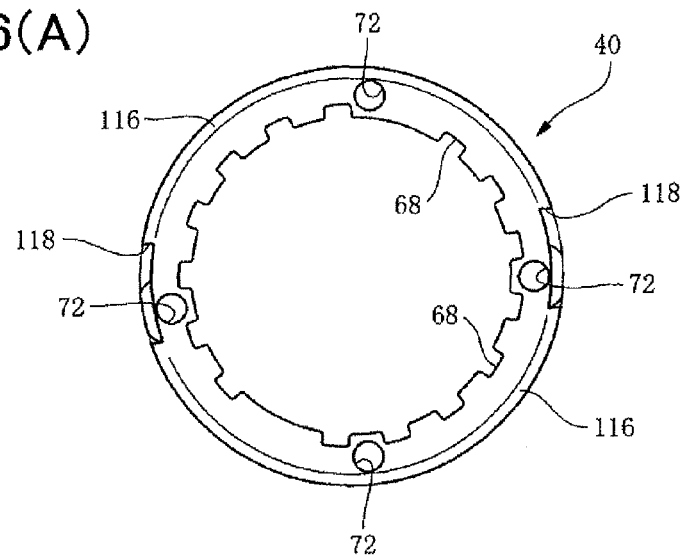
FIG. 6 is diagrams in which a ratchet member in the same embodiment mode is illustrated.
Figure 6B:
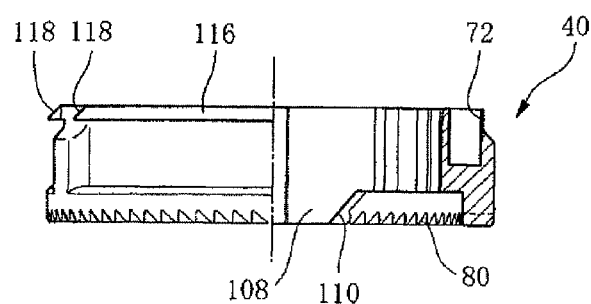
Figure 6C:
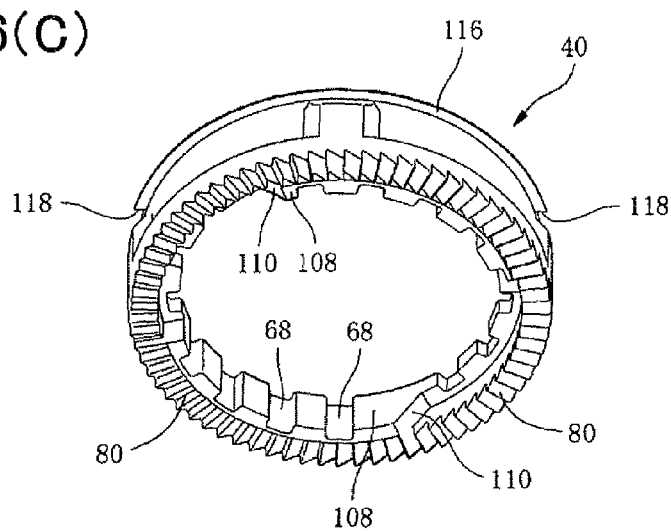

On the other hand, the ratchet member 40 is provided with a flanged portion 116 (see FIGS. 6(A)-(C)), which makes the retaining mechanism cooperatively with the elastic claws 112 of the lid member 42, by means of integral molding at the axial end of the ratchet member 40 that is present on a side of the lid member 42, and in such a form that it extends annularly around the rotational axial center of the armrest body 20 in the circumferential direction.

Figure 11B:
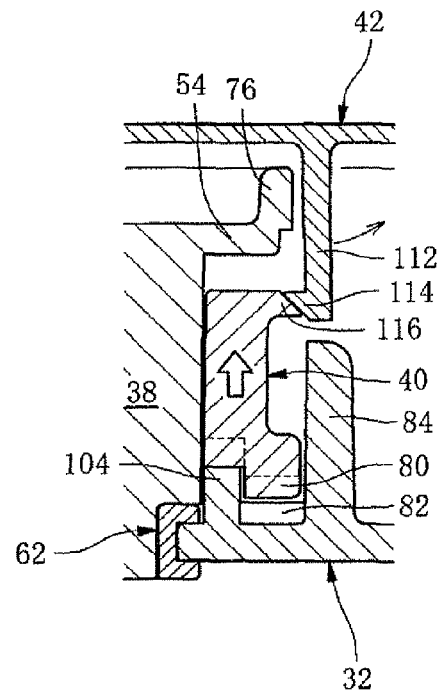
Figure 11C:
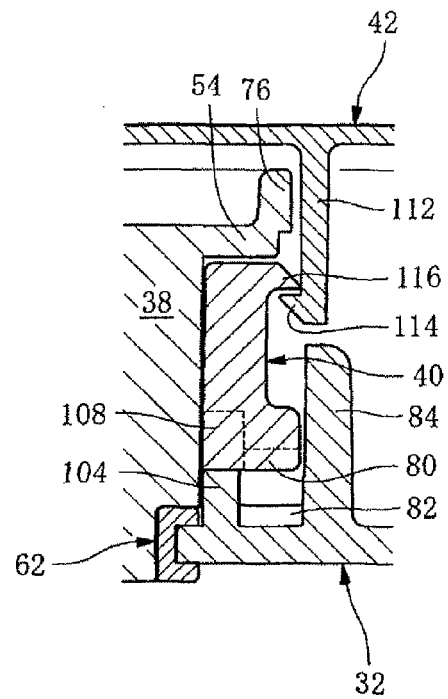

When the ratchet member 40 is pushed up axially by means of the releasing cam units 104 and driven cam units 108 as aforementioned, while elastically deforming the elastic claws 112 on the lid member 42 diametrically outward as shown in FIG. 11(B) and FIG. 11(C), the flanged portion 116 gets over those leading-end clawed portions 114 upward in the drawings. Then, where the flanged portion 116 has got over the clawed portions 114, the elastic claws 112 returns back to the original configuration by the elastic restoring forces, thereby putting the clawed portions 114 in such a state that they retain the flanged portion 116 upward from the lower side in FIG. 11(C).

The ratchet member 40 is herein retained at the pushed-up position, and thereby the armrest body 20 becomes downward rotatable freely under the circumstances.

Note that the lid member 42 rotates integrally with the armrest body 20.

When the armrest body 20 is at the rotational lower limit shown in FIG. 1(A), the elastic claws 112 of this lid member 42 is in a state of being located at the positions of later-described cut-offs 118 that are formed in the flanged portion 116. When the armrest body 20 rotates upward from this state, the elastic claws 112 also rotate in the same direction along with the armrest body 20 to move the positions. Then, where the armrest body 20 arrives at the use-range upper limit, the elastic claws 112 are put in a state of being located at the circumferentially-intermediate positions between the cut-offs 118 and 118 in the flanged portion 116, as illustrated in FIG. 11(A). Because the ratchet member 40 is pushed up under the circumstances, the elastic claws 112 retain the flanged portion 116 of the ratchet member 40 while being accompanied by elastic deformations.

As aforementioned, the flanged portion 116 is provided with the cut-offs 118, which let the clawed portions 114 of the elastic claws 112 pass axially, at two locations at a distance of 180° in the circumferential direction, as illustrated in FIG. 6.

These cut-offs 118 are those which make a returning mechanism for undoing the retainment with respect to the ratchet member 40 that has been retained at the pushed-up position by means of the flanged portion 116 and elastic claws 112, thereby returning the ratchet member 40, more specifically, the first ratchet teeth 80, to the meshing state with the second ratchet teeth 82 on the housing 32.

Figure 13A:
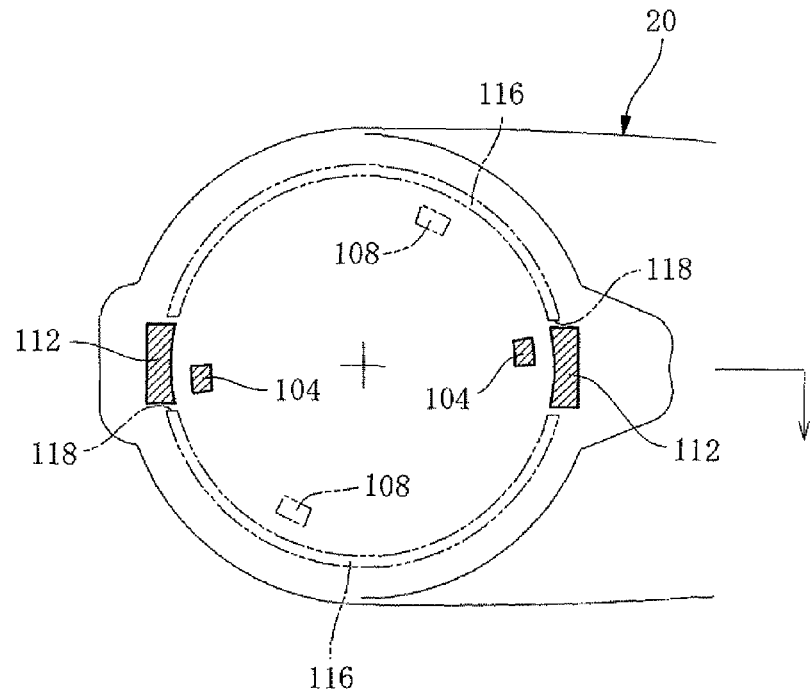
FIG. 13 is diagrams for explaining the actions that follow FIG. 12.
Figure 13B:
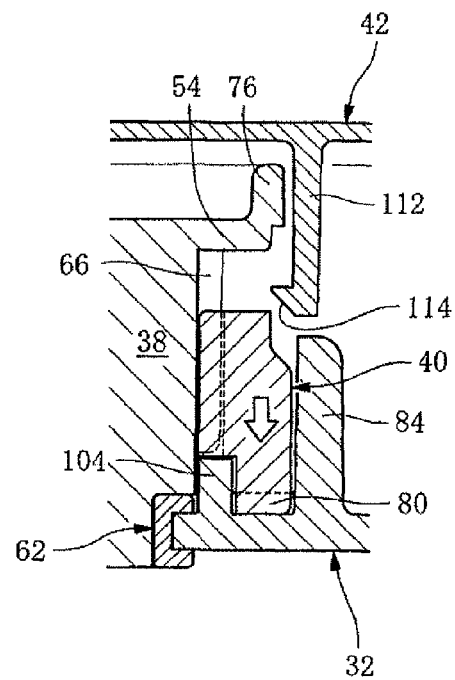

As illustrated in FIG. 10(A) and FIG. 13(A), these cut-offs 118 are put in place so as to locate at the same circumferential positions as those of the elastic claws 112, when the armrest body 20 is operated to rotate downward down to the rotational lower limit.

Figure 12A:
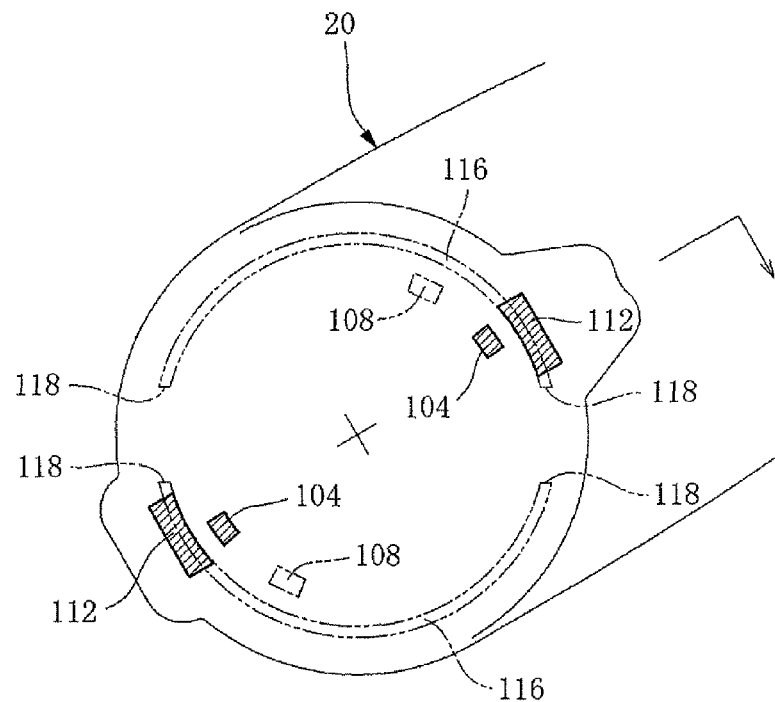
FIG. 12 is diagrams for explaining the actions that follow FIG. 11.
Figure 12B:
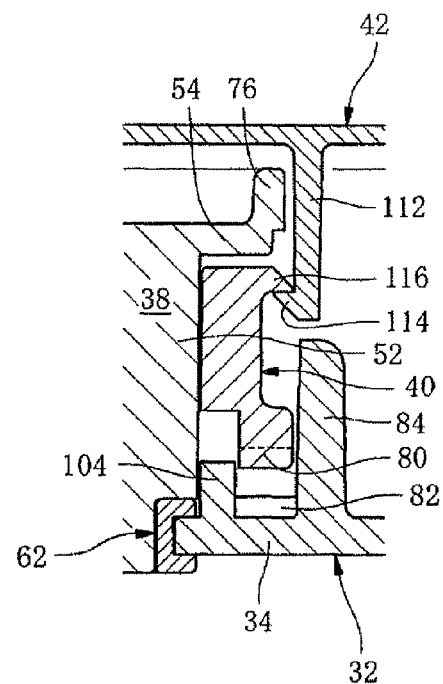

Therefore, when the armrest body 20 being rotated to the upper limit is rotated downward and then it is brought down to the rotational lower limit as illustrated in FIG. 12(A) and FIG. 13(A), the paired elastic claws 112 of the lid member 42, which rotates integrally with the armrest body 20, are put in a state of coinciding with the paired cut-offs 118, which are formed in the flanged portion 116 of the ratchet member 40, on that occasion. Thus, the ratchet member 40, which has been pushed up against the coiled springs 70 and which has been retained at the pushed-up position by the flanged portion 116 and elastic claws 112 on that occasion, is freed from the retainment, and is thereby caused to move axially toward the second ratchet teeth 82 by means of the urging forces of the coiled springs 70.

The first ratchet teeth 80 and second ratchet teeth 82 herein return to the meshing state, again.

By rotating the armrest 18 according to the present embodiment mode upward by a predetermined magnitude from the position, which is present at the rotational lower limit shown in FIG. 1(A), by means of the mechanism as above, the armrest 18 is retained at that position by means of the meshing resulting from the ratchet mechanism. Thus, the armrest 18 supports a user by receiving a load resulting from him or her by means of the meshing in the ratchet mechanism.

Moreover, in a case where angularly adjusting the angle of the armrest 18 upward a little bit more is desired, it is fine to operate the armrest 18 to rotate upward by that extent.

Figure 1B:
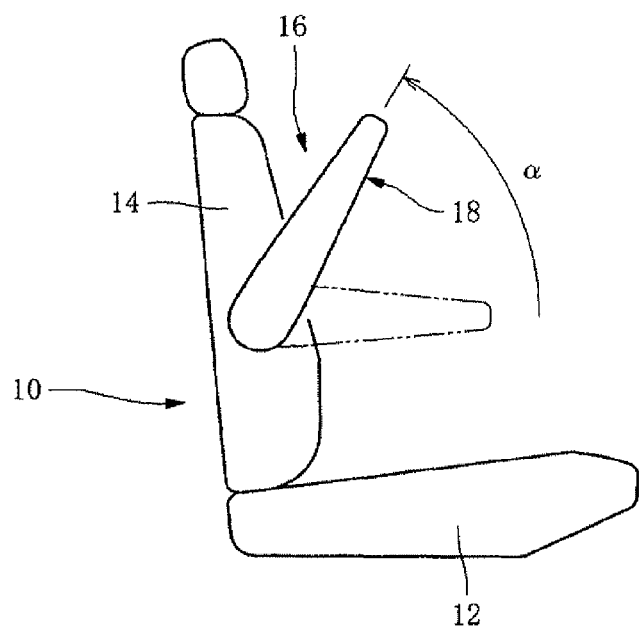

On the contrary, when positionally adjusting the position of the armrest 18 to a more downward rotary angle than the current one, the armrest 18 is pushed down to the rotational lower limit shown in FIG. 1(A) after operating it once to the use-range upper limit shown in FIG. 1(B), then the armrest 18 is operated to rotate from that position to a desired position, and thereby it is possible to positionally adjust it to a desired angle.

As described above, in the present embodiment mode, a member for the second ratchet teeth 82 cannot be disposed separately from and independently of the armrest body 20. Since not only it is possible to make the quantity of component parts required for the armrest device 16 less but also it is unnecessary to assemble such a member comprising the second ratchet teeth 82 with the armrest body 20 in a state of being integrally rotatable with the armrest body 20, it is possible to cut down the assembly man-hour requirement in that instance.

Thus, it is possible to reduce the required costs for the armrest device 16.

Moreover, since it is not needed to assemble the ratchet member comprising the second ratchet teeth 82 with the armrest body 20, it is not needed to provide them with a fit-combined structure for the assembly. Therefore, since it is possible to cut down a space for that assembly, it is possible to downsize the assembled section between the ratchet mechanism and the armrest body 20.

In the present embodiment mode, since the armrest body 20 occupying a major volume in the armrest device 16 is made of resin, it is possible to make the armrest device 16 lightweight as a whole remarkably.

In addition, since it is not needed to form the second ratchet teeth 82 on a member that is made separately from and independently of the armrest body 20, that is, since a member for the second ratchet teeth 82 is cut down and further a fastener member for fastening that member is cut back, it is possible to intend weight saving much more.

Furthermore, in the present embodiment mode, since the armrest body 20 as well as the ratchet member 40, the axial supporter 38, the lid member 42 and the slip ring 62 are all made of resin, it is possible to make the armrest device 16 lightweight remarkably compared with those conventional ones.

Moreover, in the present embodiment mode, since those second ratchet teeth 82 are formed with high-strength resin that constitutes the armrest body 20, it is possible to make the second ratchet teeth 82 be of high strength fully.

In addition, unlike the case where a separate and independent member comprising the second ratchet teeth 82 is assembled with the armrest body 20, there arises no such a problem that the assembled section has caused chattering. That is, the armrest 18 is free from rattling when being used, thereby making it possible to smoothly move the armrest body 20 in a secured manner and further enhancing its feeling of us.

Moreover, in the present embodiment mode, all of the following mechanisms are made to axially operate and then carry out their functions: the releasing mechanism for releasing the meshing in the ratchet mechanism; the retaining mechanism for retaining the ratchet mechanism in the state of being released from the meshing; and further the returning mechanism for undoing that retainment and then returning the ratchet mechanism to the meshing. Consequently, not only it is possible to readily constitute these mechanisms with simplified structures, but also it is possible to effectively prevent these mechanisms from enlarging the angle adjusting device 22 diametrically.

In addition, in the present embodiment mode, the following constituent elements are molded integrally, or the present embodiment mode is equipped with the following integrally: a releasing cam units 104 making the aforementioned releasing mechanism is molded integrally with the armrest body 20; furthermore, the driven cam units 108 corresponding to the above are molded integrally with the ratchet member 40; moreover, the flanged portion 116 and elastic claws 12 making the retaining mechanism are molded integrally with ratchet member 40 and lid member 42, respectively; in addition, the ratchet member 40 is equipped integrally with the cut-offs 118 making the releasing mechanism. As a result, it is possible to effectively cut down the quantity of component parts as a whole, and moreover the cut down accompanies making it possible to cut down is accompanied by the man-hour requirements for assembling the component parts. Therefore, it is possible to reduce the required costs for the armrest device 16 much more.

As described above, one of the embodiment modes according to the present invention has been detailed so far. However, it is no more than just one of the exemplifications. Hence, it is feasible to constitute the present invention in forms to which changes or modifications are made without departing from the spirit or scope of the present invention. For example, it is feasible to apply the present invention to armrest devices to be installed to seats other than automotive seats, and so forth.

The invention claimed is:

1. An armrest device comprising:
   (a) an armrest body to be installed with respect to a seat rotatably upward/downward at the base end;
   (b) a ratchet mechanism comprising stationary-side first ratchet teeth being disposed around a axial line of the rotation of the armrest body, and movable-side second ratchet teeth being disposed in a state of facing the first ratchet teeth and in a state of rotating integrally with said armrest body, meshing with the first ratchet teeth to be kept from moving in the downward rotary direction of the armrest body, and being capable of moving to get over the first ratchet teeth in the upward rotary direction of the armrest body;
   (c) an urging member for urging said first ratchet teeth and second ratchet teeth in such a direction that they press one another;
   (d) a releasing mechanism for separating the first ratchet teeth and second ratchet teeth away from each other, thereby releasing the meshing therebetween;
   (e) a retaining mechanism for retaining the first ratchet teeth and second ratchet teeth, which have been separated away from each other, in the separated state, thereby allowing said armrest body to rotate downward; and
   (f) a returning mechanism for undoing the retainment by means of the retaining mechanism, thereby moving the first ratchet teeth relatively in such a direction that they approach the second ratchet teeth and then returning the first ratchet teeth and second ratchet teeth to the meshing;
   whereby an angular position of the armrest body is adjustable at the use position by means of said ratchet mechanism; and
   wherein said first ratchet teeth are formed on a ratchet member that is made separately from and independently of said armrest body, and the armrest body is made of resin and said second ratchet teeth are molded integrally with the armrest body at the time of molding the armrest body;
   the releasing mechanism rotates integrally with said armrest body, and then pushes up said ratchet member axially against an urging force of said urging member when the armrest body has arrived at a use-range upper limit, thereby separating said first ratchet teeth away from said second ratchet teeth;
   said retaining mechanism comprises:
   a flanged portion that is disposed on said ratchet member in such a form as extending around said axial line; and
   a claw member being put in place on an axially opposite side with respect to said second ratchet teeth by way of said ratchet member; and
   the claw member is provided with an elastic claw that protrudes axially toward the ratchet member to serve as a retaining unit, thereby making the retaining mechanism into one in which said flanged portion is hook locked and then retained by a leading-end side clawed portion after the elastic claw deforms elastically to let the flanged portion pass axially with respect to the clawed portion at the time of pushing up the ratchet member.

2. An armrest device according to claim 1, wherein the urging member urges said ratchet member toward said second ratchet teeth on said armrest;
   and said releasing mechanism comprises a releasing cam unit molded integrally with said armrest body; and
   said retaining mechanism retains the ratchet member, which has been pushed up, at the push-up position, thereby allowing said armrest body to rotate downward from the use-range upper limit.

3. An armrest device according to claim 1, wherein said elastic claw is disposed in a plurality of pieces in a circumferential direction along said flanged portion, so as to retain the flanged portion at a plurality of locations.

4. An armrest device according to claim 1, wherein said ratchet member is made of resin, and thereby said first ratchet teeth and said flanged portion are molded integrally with said ratchet member.

5. An armrest device according to claim 1, wherein said claw member rotates integrally with said armrest body; and
   said returning mechanism comprises a cut-off that is formed in said flanged portion, and which lets said clawed portion of said elastic claw pass axially when said armrest body has arrived at a rotational lower limit, thereby undoing the retainment of the flanged portion by means of the elastic claw and then making the ratchet member movable toward said second ratchet teeth.

6. An armrest device according to claim 1, wherein a lid member comprises said claw member, the lid member being disposed in such a state that it covers said ratchet mechanism from one of the axially opposite-end sides and in such a state that it rotates integrally with said armrest body; and the lid member is made of resin, and said elastic claw is molded integrally with the lid member.

7. An armrest device according to claim 1, comprising an axial supporter being installed to said seat, thereby supporting said armrest body rotatably;

wherein said ratchet member is formed as a ring shape;

said ratchet member is assembled with said axial supporter so that said ratchet member is made stationary in the rotational direction but movable relatively in the axial direction with respect to said axial supporter by means of irregular fitting between a guide projection and a guide dent at least any one of which extends axially;

a cylindrical housing is molded integrally at said base end of said armrest body;

said axial supporter and said ratchet member are accommodated inside the cylindrical housing;

said second ratchet teeth are molded on a bottom inner face that faces axially in the housing, whereas said first ratchet teeth are formed on an axial end face of the ratchet member that faces the second ratchet teeth; and an opened portion, which is on an opposite side axially with respect to the bottom inner face of the housing, is closed by a lid member being made of resin that rotates integrally with said armrest body.

8. An armrest device according to claim 7, wherein said lid member is provided with a hooking claw that protrudes axially, the hooking claw being fit combined with respect to an outer peripheral face at an axial end of said axial supporter in an outwardly fit state that is accompanied by diametrically-outward elastic deformation, and locking diametrically inward with a locked portion on an outer peripheral face of the axial supporter; and the hooking claw fits internally in a non-idly fit state to an inner peripheral face at an axial end of said housing that is present on a side of the lid member.

9. An armrest device according to claim 2, wherein said elastic claw is disposed in a plurality of pieces in a circumferential direction along said flanged portion, thereby able to retain the flanged portion at a plurality of locations.

10. An armrest device according to claim 2, wherein said ratchet member is made of resin, and said first ratchet teeth and said flanged portion are molded integrally with said ratchet member.

11. An armrest device according to claim 2, wherein said claw member is made into one which rotates integrally with said armrest body; and said returning mechanism comprises a cut-off that is formed in said flanged portion, and which lets said clawed portion of said elastic claw pass axially when said armrest body has arrived at the rotational lower limit, thereby undoing the retainment of the flanged portion by means of the elastic claw and then making the ratchet member movable toward said second ratchet teeth.

12. An armrest device according to claim 2, wherein a lid member comprises said claw member, the lid member being disposed in such a state that it covers said ratchet mechanism from one of the axially opposite-end sides and in such a state that it rotates integrally with said armrest body; and the lid member is made of resin, and said elastic claw is molded integrally with the lid member.

* * * * *